US006673389B1

(12) United States Patent
Huntington

(10) Patent No.: US 6,673,389 B1
(45) Date of Patent: Jan. 6, 2004

(54) MANUFACTURE OF SOLID STATE CAPACITORS

(75) Inventor: David Huntington, Bovey Tracey (GB)

(73) Assignee: AVX Limited (GB)

( * ) Notice: Subject to any disclaimer, the term of this patent is extended or adjusted under 35 U.S.C. 154(b) by 0 days.

(21) Appl. No.: 10/070,230

(22) PCT Filed: Sep. 15, 2000

(86) PCT No.: PCT/GB00/03558

§ 371 (c)(1),
(2), (4) Date: Aug. 19, 2002

(87) PCT Pub. No.: WO01/22451

PCT Pub. Date: Mar. 29, 2001

(30) Foreign Application Priority Data

Sep. 17, 1999  (GB) .............................................. 9922091

(51) Int. Cl.⁷ .............................. B05D 5/12; H07G 7/00
(52) U.S. Cl. .......................... 427/79; 427/80; 29/25.03; 29/25.41; 29/25.42
(58) Field of Search .............................. 427/79, 80, 81; 29/25.03, 25.42, 25.41

(56) References Cited

U.S. PATENT DOCUMENTS

| 3,889,357 A | * | 6/1975 | Millard et al. ............. 29/25.03 |
| 4,188,706 A | * | 2/1980 | Millard et al. ............. 29/25.03 |
| 4,599,788 A | * | 7/1986 | Love et al. ................. 29/25.03 |
| 5,357,399 A | * | 10/1994 | Salisbury .................... 361/529 |

FOREIGN PATENT DOCUMENTS

WO    WO0028559    5/2000

* cited by examiner

Primary Examiner—Brian K. Talbot
(74) Attorney, Agent, or Firm—Dority & Manning

(57) ABSTRACT

The present invention concerns the field of solid state capacitors and relates particularly to massed production methods for manufacturing solid state capacitors. The present invention seeks to provide a process simplification in order to provide an economic advantage. According to one aspect of the present invention there is provided a method of manufacturing multiple solid state capacitors comprising: providing a substrate layer; forming on an upper surface of the substrate layer a plurality of upstanding bodies consisting of porous sintered valve-action material; forming a dielectric layer on the bodies; applying an electrically insulating resist layer to the dielectric layer present in a region separating adjacent upstanding bodies, forming a cathode layer on the exposed dielectric layer on the upstanding bodies and on the resist layer between the bodies; applying a cathode terminal to an upper end region of each upstanding body; dividing the processed substrate into a plurality of individual capacitor bodies each having an anode terminal portion at one end comprising divided substrate, a capacitive portion comprising ore of the porous bodies and a cathode terminal portion at the other end.

6 Claims, 2 Drawing Sheets

MANUFACTURE OF SOLID STATE CAPACITORS

BACKGROUND OF THE INVENTION

The present invention concerns the field of solid state capacitors and relates particularly to massed production methods for manufacturing solid state capacitors.

A massed production method for solid state tantalum capacitors is described in U.S. Pat. No. 5,357,399 (inventor Ian Salisbury). This method involves providing a substrate wafer of solid tantalum, forming a sintered, highly porous, layer of tantalum on the substrate, sawing the layer of porous tantalum with an orthogonal pattern of channels to produce an array of upstanding porous tantalum rectilinear bodies, anodising the bodies to produce a dielectric layer thereon, dipping the bodies in manganese nitrate solution and heating to convert the applied solution to manganese dioxide thereby to form a cathode layer, cutting along the channels to isolate the cathode and anode ends of individual upstanding bodies by removing the manganese dioxide connecting adjacent bodies, reforming a dielectric layer on the newly exposed tantalum substrate revealed by the isolation cut, applying respective conducting layers of carbon and then silver onto top ends of each body, bonding a lid consisting of a wafer of solid metal onto the silver layer, injecting insulating resin material into the channels between bodies constrained by the substrate and lid, and slicing the assembly in a direction perpendicular to the lane of the wafers and along the centre line of each channel thereby to produce a plurality of capacitors in which the anode terminal consists of substrate material, the cathode terminal consists of lid material and the capacitive body consists of the coated porous tantalum body.

This method allows the production of highly compact, reliable capacitors of a high volumetric efficiency. However with the continued miniaturization of components demanded by the electronics industry there is pressure to produce ever smaller and more efficient capacitors.

Our recent PCT publication WO 00/285 describes a modified version of the Salisbury process. In this version the volumetric efficiency of the individual capacitor bodies is increased by forming cathode terminals directly on the silver/carbon coated top ends of the porous capacitor bodies. In this way the solid lid layer applied in the Salisbury method may be omitted. The volume which would have been occupied by the solid lid layer is thus available to increase the size of the porous body. Hence for a given capacitor body size, a greater volume of capacitive material can be included.

There is continuous pressure for efficiency improvements in these manufacturing processes. The present invention seeks to provide a simplification of multiple capacitor manufacturing processes of the type described in the foregoing, thereby to provide an economic advantage which results in cheaper capacitors.

BRIEF SUMMARY OF THE INVENTION

According one aspect of the present invention there is provided a method of manufacturing multiple solid state capacitors comprising:

providing a substrate layer;

forming on an upper surface of the substrate layer a plurality of upstanding bodies consisting of porous sintered valve-action material;

forming a dielectric layer on the bodies;

applying an electrically insulating resist layer to the dielectric layer present in a region separating adjacent upstanding bodies, forming a cathode layer on the exposed dielectric layer on the upstanding bodies and on the resist layer between the bodies;

applying a cathode terminal to an upper end region of each upstanding body;

dividing the processed substrate into a plurality of individual capacitor bodies each having an anode terminal portion at one end comprising divided substrate, a capacitive portion comprising one of the porous bodies and a cathode terminal portion at the other end.

The application of an insulating resist layer after formation of the dielectric layer, and before formation of the cathode layer, considerably simplifies the isolation of anode and cathode portions of each capacitor body. The prior art isolation method involves grinding through both cathode and dielectric layers in the regions between adjacent bodies, thereby exposing fresh substrate. The dielectric layer on the freshly exposed substrate must then be re-formed by a second dielectric formation process. The present invention provides a process in which a single dielectric layer formation process is carried out. Because the, resist layer masks the dielectric layer in between adjacent bodies, no grinding through to the substrate is necessary. Hence the isolation step is considerably simplified, reducing production time and cost.

The method may further include a step in which art least a portion of the resist layer coated in cathode layer is removed. The removal may be by, mechanical, chemical or another suitable means. Preferably a portion of the resist layer around each upstanding body is removed, thereby to form a border surface free of cathode layer material around each body. En one aspect of the invention a shallow skim of the resist layer is made by machining. The skimming may be conducted by means of a cutting wheel or saw. The cut should not extend into the resist layer as far as the dielectric layer underneath. In this way the integrity of the dielectric layer is maintained.

The resist material must adhere well to the dielectric layer and form an intimate contact therewith in order to prevent contamination of the resist coated dielectric layer by cathode layer material. The resist layer may be applied as a permanent feature or a temporary feature. For example, the permanent resist layer will be retained in the structure of the capacitors which are produced by the method of the invention. Typical resist materials are fluoro-polymers and epoxy resins. An additional benefit of the permanent resist layer may be achieved by incorporating a colour or contrast in the resist which stands-out relative to the encapsulation material. In this way the final capacitors are provided with an orientation indication indicative of capacitor polarity, with the resist layer corresponding to the anode end.

A temporary resist layer would be applied prior to the manganising process (cathode layer formation) and removed before encapsulation. The temporary resist may be a photolithographic resist, a chemically detachable resist or a mechanically removable resist.

In the encapsulation process, an insulating material may be infilled between the cathode-coated and terminated capacitor bodies. When the substrate is subsequently divided the infilled insulating material forms a protective sleeve around a mid portion of the capacitor, leaving only the anode and cathode terminal features exposed. The encapsulation material is preferably a plastics resin material, in particular a setting epoxy resin.

The encapsulation may involve a preliminary stage in which e.g. powdered thermoplastics resin is introduced into the spaces between the upstanding bodies and then melted by heating of the substrate to form a layer of thermoplastic partway up the sides of each body. Preferably this preliminary part-encapsulation is conducted using a resin of different coloration to the main encapsulation resin, thereby providing a visible polarity indication in the final capacitors. Alternatively polarity may be indicated by other marking such as laser etching.

The capacitor bodies may be formed into useful capacitors by a termination process in which the respective exposed cathode and anode surfaces of each capacitor body are liquid or vapor phase coated with a termination material which facilitates electrical connection of the respective ends of the capacitor to an electric circuit.

The respective terminal coatings may form a cap on each end of the capacitor body, as in the industry-standard five-sided termination processes.

In certain preferred embodiments the valve-action material is tantalum. However other valve-action materials may be used in the process of the present invention. These may be metals or non-metals, the essential characteristic being a capacitor forming capability. Examples of suitable metals niobium, molybdenum, aluminium, titanium, tungsten, zirconium and alloys thereof. Preferred examples are niobium and tantalum.

When the valve action metal is tantalum the substrate is preferably a solid tantalum wafer, thereby ensuring physical and chemical compatibility with the porous metal.

The upstanding anode bodies may be formed by a process which involves pressing a layer of valve-action material powder onto the substrate and sintering to fuse the powdered particles. Typically a seeding layer of coarse grade powder may have to be applied to the substrate and sintered thereto before finer grade powder is pressed onto the substrate. The coarse grade powder provides mechanical keying ensuring that a strong connection between the substantive porous layer and the substrate is produced. The strong connection is necessary to ensure that separation of the porous layer from the substrate does not occur during subsequent steps in the manufacturing process. The coherent layer of porous valve action metal thereby produced may be machined or otherwise processed to produce the individual anode bodies. The bodies may be formed by machining of a porous sintered layer formed on the substrate. The machining may be by means of orthogonal sawing to form rectilinear bodies. Other body formation process may be used, for example a combined pressing and casting of individual bodies, as described in our co-pending application number 9918852.6.

The dielectric layer may be formed by an electrolytic anodization process in which an oxide film is gradually built up on the surface of the porous sintered anode body. Suitable methods will be known to the person skilled in the art.

The cathode layer may be formed by dipping the anode bodies into a cathode layer precursor solution such as manganese nitrate and then heating to produce a cathode layer of manganese dioxide. Repeated dipping and heating steps may be carried out in order gradually to build up the required depth and integrity of cathode layer.

With the application of the cathode layer, the anode body becomes a capacitive body comprising an anode portion consisting of an interconnected matrix of: valve acting powder; dielectric insulating layer of valve acting oxide; and a conducting cathode layer of doped oxide.

According to a further aspect of the invention there is provided a capacitor produced by any method hereinbefore described.

According to another aspect of the invention there is provided an electronic or electrical device comprising a capacitor made by any method hereinbefore described.

Following is a description by way of example only and with reference to the drawings of one method of putting the present invention into effect.

DETAILED DESCRIPTION OF THE INVENTION

Figure 1:
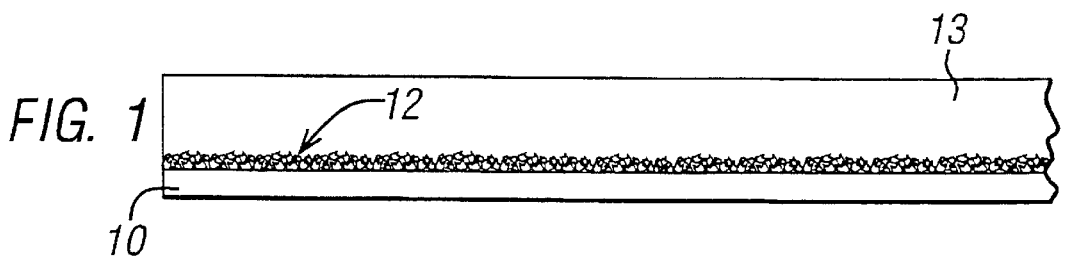
FIGS. 1 and 3 to 5 are cross-sectional views of a substrate during processing according to one embodiment of the present invention.

A transverse section through a solid tantalum circular wafer is shown as 10 in FIG. 1. An upper surface of the wafer has sintered thereon a dispersion of coarse grained capacitor grade tantalum powder 12. A green (i.e. un-sintered) mixture of fine-grained capacitor grade tantalum powder is then pressed onto the upper surface of the substrate to form a green layer 13.

The green layer is sintered to fuse the fine grained powder into an integral porous network. The sintering is carried out at around 1600 degrees centigrade (the optimum temperature will depend upon the grain size and the duration of the sintering process). The sintering process also fuses the porous layer to the coarse seeding layer 12.

Figure 2:
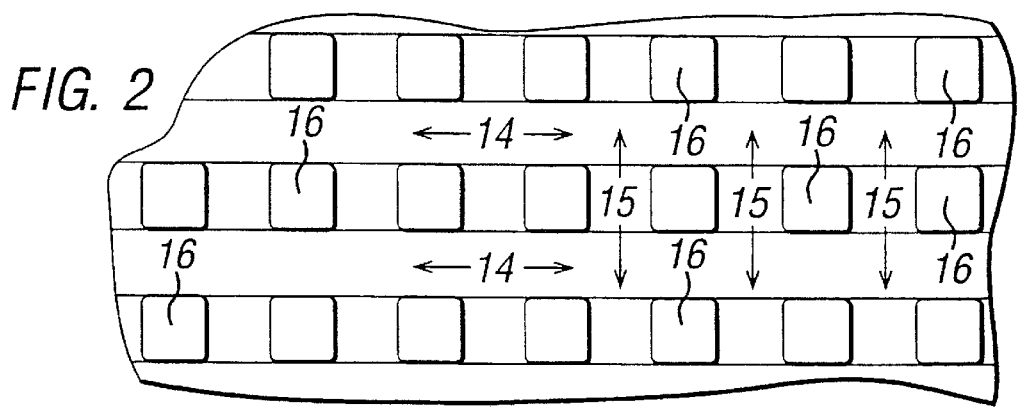
FIG. 2 is a view from above of the substrate after a machining step in the process.
Figure 3:
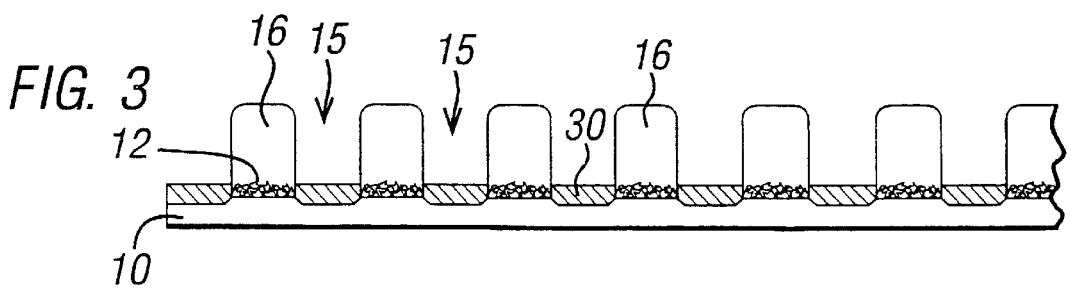
Figure 4:
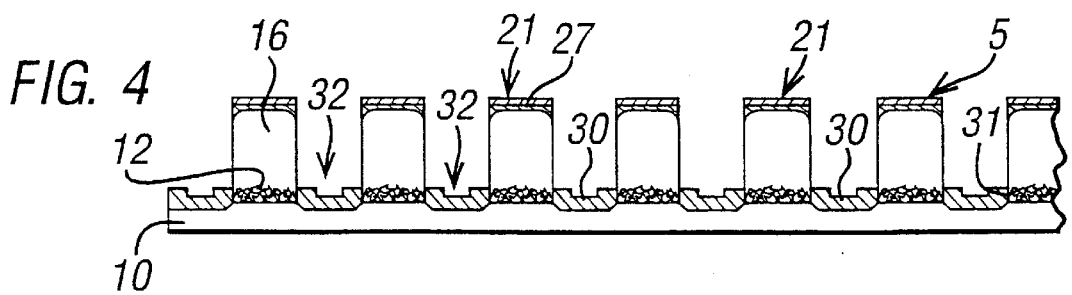

The substrate assembly is then machined to produce an orthogonal grid so transverse channels 14 and longitudinal channels 15 as shown in FIG. 2. The channels are ground using a moving rotating cutting wheel. The channels are cut to a depth just beyond the level of the porous tantalun layer so that the cuts impinge on the substrate, as shown in FIG. 3.

The machining process produces an array of orthogonal section bodies 16 o the substrate. The porous bodies fort the anode portions of the capacitors. An insulating dielectric layer (not shown) is applied to the anode bodies by anodizing in an electrolyte bath (of e.g 0.1% phosphoric acid solution) while connecting the positive terminal of a D.C. power supply to the substrate. This results in the formation of a thin tantalum pentoxide layer on the valve acting porous surface of the bodies and exposed substrate.

A resist layer 30 of heat resistant electrically insulating material is then applied along the channels 14 and 15. The resist layer surrounds the upstanding bodies 16 and masks the underlying tantalum oxide layer formed on the substrate exposed surface. The lower exposed surfaces 31 of the anode bodies are also masked by the thickness of the resist layer.

If the resist material requires curing at high temperatures, or the deposition or curing processes impart any stress on the external surfaces of the capacitors then it may be necessary to repeat the anodization process prior to the cathode layer being applied.

A cathode layer (not shown) is then formed on the anode bodies by the well known manganisation process. In this process the anodized anode bodies 16 are immersed in manganese nitrate solution to leave a coating of wet solution on each body and covering its internal porosity. The substrate is heated in moist air to convert the coating of nitrate to the dioxide. The immersion and heating cycles may be repeated as many as 20 times or more in order to build up the required coherent cathode layer. The thickness of the insulating resist layer provides an insulation separation between the substrate (which becomes the anode terminal in the final capacitors) and the cathode layer which is electrically connected to the cathode terminal. During the manganising (cathode layer deposition) process and/or carbon/silver cathode termination process the resist layer may have been partially coated with conductive material, and this is a potential current leakage path. In order to avoid this problem it is preferred that resist material be energetically and chemically incompatible with respect to the cathode layer material or the termination materials (e.g. carbon and silver paste). By energetically and chemically incompatible it is meant that the resist layer should be substantially non-wettable and chemically inert with respect to the cathode layer or termination layer liquid materials. However where unwanted contamination is unavoidable the stray material may be removed by a further process step. In the case of permanent resist materials this may be by chemical etching or dissolution, mechanical grinding or dicing or localised heating, such as by means of a laser. For temporary materials the resist layer can be selectively removed as appropriate by the usual removal methods for that material. Hence in an example of the invention a thin layer of resist material and any coated conductive material is removed by a shallow cut 32 made along the centre line of each channel in order to remove a narrow channel of resist material and its coated layer of cathode material.

Once the manganisation is complete the top end regions of the manganised bodies are coated with an intermediate layer 27 of conducting carbon by dipping into a bath of liquid carbon paste. After the carbon layer has set, a further intermediate layer 21 of silver is coated onto the carbon layer by dipping of the carbon-coated bodies into a liquid silver paste. The silver layer is not allowed to pass beyond the carbon layer 27 in order to ensure that silver does not directly contact the incompatible oxide layer. The silver layer 21 is then allowed to set solid.

Figure 5:
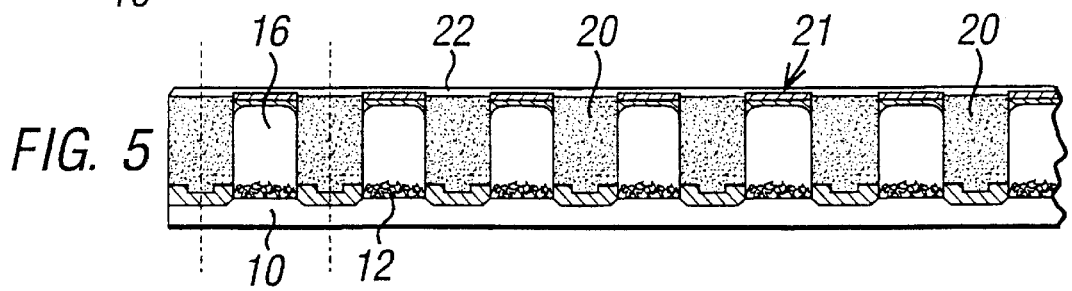

The channels 14,15 between the capacitor bodies are filled with liquid epoxy resin 20 as shown in FIG. 5. The resin surrounds the sides of each capacitor body, up to a level just below to top end of each capacitor body. The channels are filled by injection of the resin, thereby ensuring complete filling of the space defined by the channels. The top surface of the whole assembly is coated with a further silver paste layer 22. A temporary solid lid plate (not shown) may be applied to the silver layer in order to ensure that a flat finish is produced. The lid may also be used to provide structural constraint during resin injection.

Figure 6:
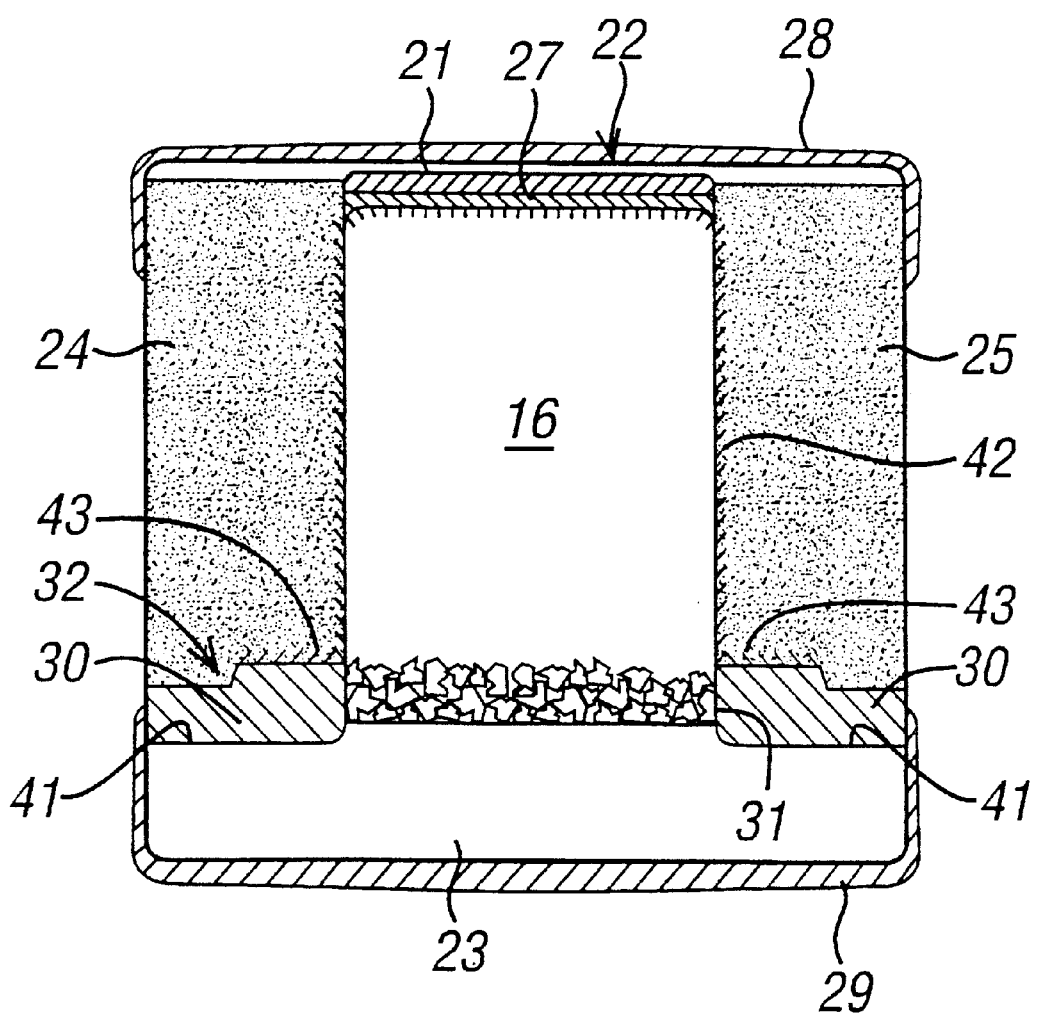
FIG. 6 shows sectional view from one side of a capacitor produced according to the method of the present invention.

The wafer may now be sliced along the centre line (shown as dashed lines in FIG. 5) of each channel 14,15 in order to separate each capacitor body from its neighbors. The resulting individual capacitor structure is shown in FIG. 6.

Each capacitor consists of an anode terminal portion 23 consisting of the substrate material upstanding from the substrate is the capacitor body 16 which is sheathed in epoxy resin sidewalls 24,25. The top end region of each capacitor is coated in a layer of carbon paste 27, a layer of silver paste 21 and a further layer of silver paste 22 which forms a cathode terminal portion of the component. Around the foot of each body 16 is the resist layer 30. The resist layer is coated on the dielectric layer of the substrate upper surface 41 and the lower side wall regions of the body 16. The cathode layer of manganese dioxide is shown as layer 42. This layer extends over substantially the whole of the upper surface of the body. The cathode layer also covers an inner border portion 43 of the resist layer. The narrow cut 32 forms a step in the resist layer. The step is free of cathode layer material and forms an intimate bond with the encapsulating material 24/25. The thickness of the resist layer provides an isolation separation between the cathode layer 42/43 and the anode terminal 23.

A final processing stage is a five-sided termination process. This is a well known process in the electronics industry which involves the formation of end cans 29,29 which form the external terminals of the capacitor. The termination layer metal may consist of discrete layers of silver, nickel and tin (preferably in that order). These are suitable metals for forming electrical connections by soldering of the capacitor terminals to contacts or other components of an electrical or electronic circuit.

The present invention is an elegant adaptation of the previously known processes which provides a significant simplification of the manufacturing process. The need for a second, time consuming dielectric layer formation step is removed, considerably improving the efficiency of the process, allowing cost reductions and reliability improvements.

What is claimed is:

1. A method of manufacturing multiple solid, state capacitors comprising:

providing a substrate layer;

forming on a surface of the substrate layer a plurality of upstanding bodies consisting of porous sintered valve-action material;

forming a dielectric layer on the bodies;

applying an electrically insulating resist layer to the dielectric layer present in a region separating adjacent upstanding bodies;

forming a cathode layer on the exposed dielectric layer on the upstanding bodies and on the resist layer between the bodies;

applying a cathode terminal to an upper end region of each upstanding body;

dividing the processed substrate into a plurality of individual capacitors, each having an anode portion at one end comprising the divided substrate, a capacitive middle portion comprising a porous body and a cathode terminal portion at the other end, characterised in that as the resist layer is applied it encapsulates a base portion of the sidewalls of each body, and after application of the cathode layer the remainder of the sidewalls of the bodies are further encapsulated in a protective insulating material, whereby the divided capacitors have sidewalls encapsulated at a substrate end portion thereof with resist material and elsewhere with the further protective insulating material.

2. A method as claimed in claim 1 wherein at least a portion of the resist layer coated in cathode layer is removed after application of the cathode layer.

3. A method as claimed in claim 2 wherein a portion of the resist layer around each upstanding body is removed, thereby to form a border surface free of cathode layer material around each body.

4. A method as claimed in any preceding claims 1–3 wherein the resist layer is coloured or of contrasting tone with respect to the encapsulating material whereby the final capacitors are provided with an orientation indication indicative of capacitor polarity, with the resist layer portion corresponding to the anode end.

5. A method as claimed in any preceding claims 1–3 wherein the substrate material is thermally and electrically compatible with the valve-action material.

6. A method as claimed in claim 5 wherein the valve action material is tantalum and the substrate material is solid tantalum.

* * * * *